H. N. H. FISCHER.
BIRD CAGE PERCHES.

No. 181,526. Patented Aug. 29, 1876.

Wittnesses
Albert Smith
Geo. R. Dorman

Inventor.
Henry N. H. Fischer

UNITED STATES PATENT OFFICE.

HENRY N. H. FISCHER, OF WEST TROY, NEW YORK.

IMPROVEMENT IN BIRD-CAGE PERCHES.

Specification forming part of Letters Patent No. 181,526, dated August 29, 1876; application filed July 31, 1876.

*To all whom it may concern:*

Be it known that I, HENRY N. H. FISCHER, of West Troy, Albany county, and State of New York, have invented a new and useful Improvement in Bird and Fowl Perches; and I do hereby declare that the following is a full, clear, and exact description thereof, which will enable others skilled in the art to make and use the same, reference being had to the accompanying drawings, in which—

Figure 1:
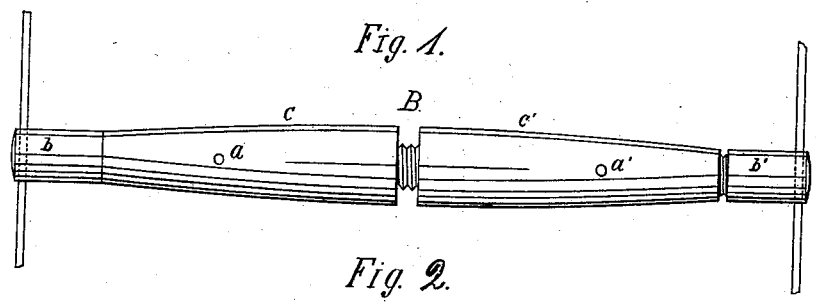
Figure 2:
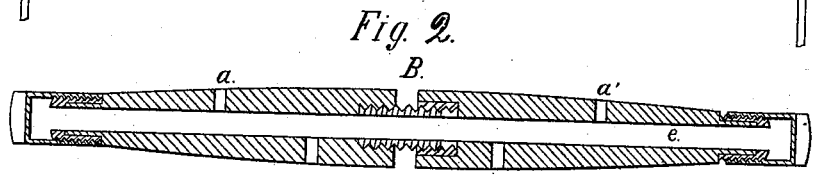
Figure 3:
Figure 4:
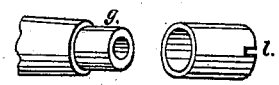

Figure 1 is a geometrical elevation of the perch in proper position between the wires of a bird-cage. Fig. 2 is a vertical longitudinal section through the center of the perch. Fig. 3 is a cross-section through the stick or perch. Fig. 4 shows one end of perch with ferrule, and having cap removed.

Similar letters of reference indicate like parts.

The object of my invention is to form a convenient retreat, during the day, for insects that infest birds and fowls during the night, in a place easily accessible, and from which they may be removed and destroyed.

My invention consists of a hollow perch, (represented by Fig. 1) into which the insects creep through the lateral apertures $a$ and $a'$, and from which they may be removed by removing the screw-caps $b\ b'$, or by unscrewing the parts $c\ c'$, by means of the screw-joint at B. The perch is held in position by means of the ferrules $b\ b'$, which may be either screw or plain, with niche $l$, better shown by Fig. 4, clasping the wires of the cage, or otherwise attached to the sides of the cage or apartment where birds or fowls are confined. The perch may be of any desired shape, length, or size, having an internal cavity, $e$, of any desired size or shape, running the entire length of the perch. $a\ a'$ are small lateral openings of any desired number from outside into the cavity. B is an adjustable screw-joint lengthening or shortening the perch to suit a large or small cage or apartment; also, for removing insects. $g$, in Fig. 4, is an inner ferrule for protection of the end of the perch.

Having thus described my invention, what I claim as new, and desire to secure by Letters Patent, is—

A bird-perch, having the internal longitudinal cavity and the lateral apertures, also having the medial screw-joint and terminating-caps, substantially as described and shown, for the purposes above set forth.

Dated Troy, New York, July 28, 1876.

HENRY N. H. FISCHER.

Witnesses:
   GEO. R. DONNAN,
   ALBERT SMITH.